United States Patent [19]
Miserlis

[11] 4,159,992
[45] Jul. 3, 1979

[54] REMOVAL OF PLASTIC POLYMER FINES FROM TALLOW

[75] Inventor: Constantine D. Miserlis, Arlington, Mass.

[73] Assignee: The Badger Company, Inc., Cambridge, Mass.

[21] Appl. No.: 921,735

[22] Filed: Jul. 3, 1978

[51] Int. Cl.[2] .......................... C11B 1/12; C11C 1/04; C09F 5/10

[52] U.S. Cl. .............................. 260/412.6; 260/412.8; 260/418; 260/419; 260/428.5; 210/21

[58] Field of Search .................. 260/412.6, 412.8, 418, 260/419, 428.5

[56] References Cited

U.S. PATENT DOCUMENTS

| | | | |
|---|---|---|---|
| 3,064,018 | 11/1962 | Brulra | 260/412.8 |
| 3,098,034 | 7/1963 | Groll | 260/428.5 |

OTHER PUBLICATIONS

A.O.C.S. recommended practice, Ca 16–75.

*Primary Examiner*—John Niebling
*Attorney, Agent, or Firm*—Schiller & Pandiscio

[57] ABSTRACT

The invention provides a system for purifying tallow. Tallow received from rendering plants typically is contaminated with suspended plastic polymer fines. According to this invention plastic polymer fines are removed from tallow containing such fines by adjusting the temperature of the tallow to just above its freezing point, and contacting the tallow in a selected organic solvent to form a solution comprising the solvent containing dissolved tallow, and particles of undissolved plastic polymer. The resulting solution is then filtered to remove the particles of undissolved plastic polymer, and the filtrate which results is treated to separate the tallow from the solvent, e.g. as by evaporating the solvent under reduced pressure. The separated solvent may be condensed and recycled to treat fresh tallow.

16 Claims, 1 Drawing Figure

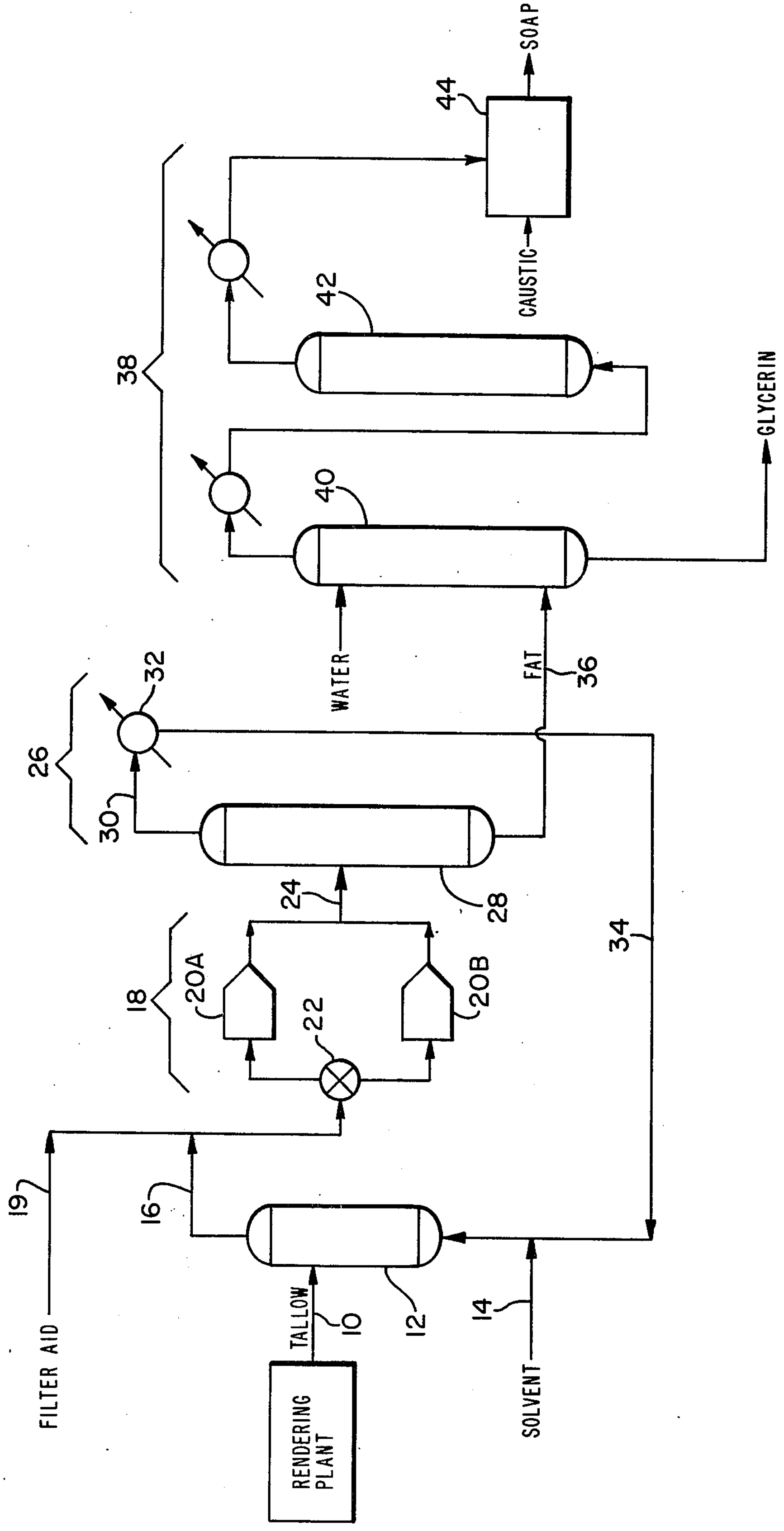
SOAP
44
CAUSTIC
42
38
GLYCERIN
40
WATER
FAT
36
32
26
30
28
24
18
20A
22
20B
34
19
16
FILTER AID
TALLOW
10
12
14
SOLVENT
RENDERING PLANT

REMOVAL OF PLASTIC POLYMER FINES FROM TALLOW

This invention relates to the processing of tallow and more particularly to a process and apparatus for effecting the removal of polyethylene and/or other plastic polymers present as contaminants in tallow. While the invention may find applicability in different areas, it will be explained in connection with a specific manufacturing process, namely soap making.

The conversion of naturally occurring fats and oils to soap has been known for hundreds of years. The basic process involves splitting a fat stock into fatty acids and glycerin, separating the resulting fatty acids, and neutralizing the fatty acids with an alkali. Two manufacturing systems are in common commercial use today, the kettle system and the continuous hydrolyzer system.

The kettle system essentially comprises a modern day scale-up of early soap making systems. A modern day soap kettle may have a capacity of 60,000–300,000 lb and is equipped for heating, settling, and blending a fat stock, caustic and brine. Generally, the fat stock comprises a mixture of rendered animal fats ("tallow"), and one or more vegetable oils, and the caustic comprises sodium hydroxide solution. The kettle is charged with the mixture of rendered fats, oils and the sodium hydroxide solution. Then follows a sequence of heating, separating, and washing to convert the raw materials to finished base soap and to separate the impurities and by-products. The process normally takes several days for a single kettle. Although there have been improvements in handling and purificiation, such as continous centrifugation, the basic process of saponifying fats directly with caustic remains unchanged from early days of soap making.

The overall process in a modern day kettle system is as follows:

A feed consisting of a selected fat feedstock is heated up and introduced under pressure to a homogenizer. A typical fat feedstock may consist of about 75% tallow and 25% coconut oil or palm oil. The homogenizer typically consists of a rotating basket disposed within a perforated cylinder. The latter is contained within a housing which is open at the bottom. The feed is forced through the perforated outer cylinder into the space between the basket and the cylinder. The intervening space is in the order of about $\frac{1}{4}$ to $\frac{1}{2}$ inch and the fat is homogenized in this region and reacts with sodium hydroxide solution which is also forced through the outer cylinder. Brine is introduced with the sodium hydroxide and/or the fat feedstock. Alternatively the brine may be separately introduced into the homogenizer. The reactants and any initial reactant product flow from the homogenizer down into a reactor which is located directly below the homogenizer. The reactants may have a residence time in the reactor of about 20 seconds. The process is continuous with the homogenizer continuously discharging material into the reactor and the reactor continuously discharging product into a dwell tank. The latter is located below the reactor. A "Chinese hat" valve is located at the bottom end of the reactor and controls the rate of flow of reaction products into the dwell tank. The Chinese hat valve is controlled by a counter weight, with the amount of counter weight determining the position of the valve. The reaction product typically is retained in the dwell tank for about 20 minutes, after which it is washed to extract glycerin and other soluble materials. The product then is passed to a dryer where the high water content is removed. The dried product is essentially soap. This soap product is sent to holding tanks. The holding tanks hold a large quantity of the product which is inspected and "trimmed" as required. Caustic is added if the product shows insufficient saponification and additional feedstock is added if the product has too much of a caustic content. The trimming may be done in the holding tanks, but generally the material is transferred from the holding tanks to finishing kettles.

The continuous hydrolyzer system has a number of significant differences over the kettle process. Overall the continuous hydrolyzer system consists essentially of the steps of (1) continuous hydrolysis, (2) fatty acid distillation, (3) saponification, i.e. neutralization and (4) glycerin recovery. Development of continuous hydrolysis was the key step to the continuous hydrolyzer system. In the hydrolysis reaction, a fat feedstock (i.e. tallow and one or more vegetable oils) and water are reacted to form fatty acid and glycerin according to the following equation:

$$(RCOO)_3C_3H_5 + 3H_2O \rightleftharpoons 3RCOOH + C_3H_5(OH)_3$$

where R is an alkyl of $C_8$ or larger. Actually, it is believed that the hydrolysis reaction takes place in two steps, with diglyceride and monoglyceride being formed at a first step and the fatty acids and glycerin being formed at a second step. The hydrolysis reaction requires intimate contact between the fat feedstock and water. However, fat and water are essentially immiscible at room temperature. Accordingly the normal procedure is to conduct the hydrolysis step at elevated temperatures and pressures at which the fat feedstock is soluble in the water to some extent. For example hydrolysis may be conducted at a temperature of about 250° C. and a pressure of about 750 psi. The hydrolysis reaction is reversible. However, the hydrolysis reaction may be made to proceed to the right by increasing the proportion of water to fat, or by removing glycerin. Most processors favor the removal of glycerin to force the reaction to the right. Typically the required combination of high temperature, high pressure, and glycerin removal is accomplished in a countercurrent hydrolyzer column, e.g. as shown in FIG. S-20 on page 1046 of *Chemical and Process Technology Encyclopedia*, Douglas M. Considine, Ed., McGraw-Hill Book Company, (1974).

The overall process in a modern day continuous hydrolysis system is as follows:

The fat feedstock may be mixed with dry zinc oxide catalyst, and the resulting mixture is then heated to hydrolyzing temperature by direct steam injection or by heat exchange, or the fat feedstock may be introduced directly into the hydrolyzer column without catalyst addition. The fat feedstock is pumped into an hydrolyzer column near the bottom, while super-heated water is introduced into the column near the top, resulting in a countercurrent flow of water downward through rising fatty material. The hydrolysis occurs in a two-phase system. The fats, oils, and fatty acid product flow continuously upwardly in the column with droplets of water falling downwardly through the upwardly flowing materials. Glycerin produced in the reaction is dissolved in the downwardly falling water droplets. Fresh water entering the column at the top reduces the glycerin to the lowest possible point, while a glycerin-water seat maintained at the bottom of the column (where the glycerin content is highest) prevents fatty material from washing out. The fatty material passes upward through column with about 99% completeness in splitting.

The next step comprises the distillation step. Generally, the fatty acids from the hydrolyzer are collected in a still feed tank where they are vacuum-dried to reduce moisture. Then the moisture reduced fatty acids are flash-distilled at low pressure. Typically, the still bottoms may be recirculated through heat exchangers in known manner back to the still to carry the heat necessary for vaporizing the fatty acids. The still bottoms are then removed from the system, and may be recycled into the hydrolyzer column or may be acidulated to remove the zinc, and the bottoms recovered, e.g. for animal feed, or discarded. The fatty acid vapors from the still overhead are condensed and passed to a saponifier where the fatty acids are contacted with an alkaline solution to produce soap. The saponification reaction between the alkaline solution and the fatty acids is almost instantaneous and proceeds according to the following reaction:

$$RCOOH+NaOH\rightarrow RCOONa+H_2O$$

Each reactant is metered accurately into the saponifier, where intimate mixing occurs and the reaction takes place. Soap from the saponifier may then be discharged to a blend tank prior to finish processing into products, e.g. soap powders, granules, or toilet bars.

The glycerin in the water stream from the hydrolyzer may be recovered, e.g. by concentration and purification, and removed from the system.

The primary raw materials used in the manufacture of soap are animal fats and vegetable oils. Soap manufactureres today typically employ a blend of rendered animal fats and a vegetable oil, such as coconut oil or palm oil. As is well known in the art rendered animal fats ("tallow") comprise the mixed glycerides obtained by boiling water, steam or hot oil rendering raw fat stocks of animals such as cattle and sheep. Typically the raw fat stocks are digested by boiling water, with tallow forming as a layer above the water where it can be removed. The tallow is then deaerated in a vacuum still to improve the color of the tallow prior to introducing the tallow into the soap making process. A problem encountered in the manufacture of soap is that tallow received from rendering plants typically is contaminated with polyethylene and/or other plastic polymers in very fine particle form. The plastic polymer material originates from polyethylene or other plastic bags which are employed when the animal fat renderings are collected from the butcher shops and the like. Typically, the tallow may contain 1000 parts or more of plastic polymer fines per million parts of tallow. Some rendering plants attempt to separate the plastic bags from the raw animal fats prior to rendering in which case the tallow may contain relatively little plastic material, e.g. 100 parts or less of plastic polymer fines per million parts of tallow. However, separating the plastic polymer bags from the raw animal fats prior to rendering is labor intensive and thus adds appreciably to the cost of rendering the animal fats.

A small size soap plant will generally process approximately 80 million pounds of fat annually. Therefore, the amount of plastic polymer material passing through even in a small plant is substantial. A larger size and more efficient soap plant may process 150 to 200 million or more pounds of fat per year. Therefore, the amount of plastic polymer material which may pass through such a system is quite large.

The problem which results from the presence of plastic polymer fines in the tallow is that the plastic polymer material tends to accumulate in the soap making apparatus, forming deposits on the walls of tubes, in vessels, columns, etc. This fouls up the apparatus so that in some cases, it may be damaged, or the apparatus must be shut down for cleaning. Prior attempts to remove plastic polymer fines from tallow have not proved successful. The rendering operation subdivides the plastic polymer material into extremely fine particles which are generally too small to settle out. Moreover, the respective densities of the plastic polymer fines and tallow are too close to permit separation by centrifuging. And, conventional filtering techniques also are not suitable for separating the plastic polymer fines from tallow due to the fact that the tallow is not readily flowable except at elevated temperature, e.g. 100° C. The plastic polymer material is soft and flowable at such temperature and thus tends to clog filters.

It is thus a primary object of the present invention to provide a system, i.e. process and apparatus, for processing tallow which overcomes the aforesaid problems of the prior art.

Another object of the present invention is to provide a simple and economical process for removing contaminants of polyethylene or other plastic polymer material in fine particle form from tallow received from rendering plants, and to provide apparatus for effecting such removal. Other objects of the invention will in part be obvious and will in part be apparent hereinafter.

In accordance with this invention plastic polymer fines are removed from tallow by adjusting the temperature of the tallow to just above its freezing point, and contacting the tallow with a selected organic solvent material to dissolve the fat content of the tallow in the solvent and thereby form a solution comprising the organic solvent and dissolved tallow fat and containing undissolved plastic polymer fines. Preferably, the dissolution of the tallow fat is conducted so that little or no plastic polymer material is dissolved in or softened by the solvent. The resulting solution is filtered to remove the undissolved plastic polymer fines, and the resulting filtrate is then treated to separate the fat from the solvent. In a preferred embodiment of the invention the selected organic solvent comprises a relatively low boiling point organic material (or mixture of materials) and the solvent and fat are separated by evaporating the solvent under reduced pressure. The separated solvent is then condensed and recycled to treat additional tallow, while the fat, which is substantially free of or at least has a reduced plastic polymer content, may then be passed to a soap manufacturing system for conversion to soap.

Other objects, the specific nature and many of the attendant advantages of the present invention are described or rendered obvious from the following detailed description taken in connection with the accompanying drawing which is a schematic illustration of a preferred embodiment of the invention.

The organic material which is used as the solvent for dissolving the fat content of the tallow in accordance with the technique of the present invention should be liquid at the freezing point of tallow. As is well known in the art the freezing point of tallow depends on the origin of the tallow and typically is in the range of about 40°-50° C. Moreover, the solvent should comprise an organic material in which appreciable quantities of tallow fat may be readily dissolved at or near the tallow freezing point. Also, to facilitate subsequent separation of fat and solvent, the solvent preferably should have a boiling point below about 150° C. at 760 mm Hg. The reason for this latter consideration will become clear from the description following. A large number of organic materials are liquid in the aforesaid temperature range and are known to dissolve tallow fats, among which are mentioned: halogenated hydrocarbons such as 1,1,1-trichloroethane, trichloroethylene, methylene chloride, trichloromethane (chloroform), carbon tetrachloride, ethylchloride, dichloromethane, ethylenedichloride, dichloro-difluoromethane, methylene fluoride and ethylfluoride; esters such as ethyl acetate, butyl acetate and amyl acetate; ketones such as methyleneketone and methylethylketone; aliphatic hydrocarbons such as hexane and heptane; cyclic hydrocarbons such as cyclohexane and cycloheptane; and aromatic hydrocarbons such as naphtha, benzene, toluene, napththalene, and the like. One skilled in the art will recognize that these same liquid organic materials are known to dissolve or soften polyethylene and other common plastic polymer materials. The present invention is based on the discovery that at certain temperatures and limited contact times the fat content of tallow will be selectively dissolved in an organic solvent in preference to polyethylene or other plastic polymer material contained in the tallow.

The overall process is as follows: First the temperature of the tallow is adjusted to just above its freezing point, e.g. about 40°-50° C. Since tallow is normally handled at a temperature of about 60°-100° C., this typically means cooling the tallow. The cooled tallow is then contacted with a selected liquid organic material in which the tallow is soluble for a time sufficient for the fat content of the tallow to dissolve in the solvent. The contact time will vary depending on a number of factors including the particular solvent used, the origin of the tallow, temperature of the materials, degree of agitation and relative amounts of tallow and solvent. It should be noted, however, that contact time should be as brief as possible in order to minimize the amount of plastic polymer material that may also dissolve or soften in the presence of the solvent. In this regard it has been noted that the solubility or softening of plastic polymer material such as polyethylene in organic solvents is a time-temperature dependent phenomena. In the event that the solvent is capable of softening or dissolving the plastic polymer material on prolonged content, it is preferred that the contacting with the tallow be controlled so that little or none of the plastic polymer material is dissolved or softened to the point where the dissolved material may clog downstream equipment. By way of example, at 40° C. polyethylene fines may remain substantially unaffected by chloroform for twelve hours. On the other hand, these same polyethylene fines will begin to soften in hot chloroform (65° C.) in about ten minutes, and will be fully softened in the hot chloroform solution within about two hours.

After the tallow fats are dissolved in the liquid organic solvent, the resulting solution is then passed through a conventional filter to remove the undissolved plastic polymer fines, and the tallow fats are then separated from the organic liquid solvent, for example, by stripping the solvent by vacuum distillation. The recovered tallow fats may then be passed directly to a hydrolyzer for conversion to soap, and the stripped solvent recondensed and returned to the process for admixture with fresh tallow.

Referring now to the drawing, there is shown apparatus for soap making that incorporates a preferred embodiment of the invention. The illustrated apparatus is intended for normally continuous operation with rendered animal tallow being continually supplied as raw material and soap being continually recovered as product. The animal tallow is supplied to the system as it comes from a renderer and typically includes from 100-1000 parts of finely divided polyethylene particles per million parts by volume of tallow. The tallow is adjusted to temperature of about 50° C., and then it is supplied via an appropriate supply line 10 to column 12 wherein the tallow is contacted with 50° C. chloroform which is continuously fed to column 12 via a line 14. Contact is preferably achieved by counter-contact flow of the animal tallow and the solvent. The tallow and chloroform are contacted in volume ratios in the range of 1 to 3 parts of tallow to 1 part of chloroform which is sufficient to dissolve the entire fat content of the tallow in the chloroform. A solution comprising chloroform and the dissolved tallow is recovered from the top of the column. The polyethylene particles remain largely undissolved, and are carried, in particulate form, out the top of the column. Column 12 is operated at a temperature of about 50° C. Residence time of the tallow in column 12 is approximately 2 to 10 minutes. Under these conditions all of the fat content of the tallow is dissolved in the chloroform while practically none of the polyethylene particles are dissolved or softened therein to the point of presenting a problem of clogging downstream equipment.

The overflow from the top of the column 12 which is at 50° C. is then passed via a line 16 to a filter system indicated generally at 18 wherein the polyethylene particles are removed from the solution by a conventional filtering process. So as to improve filtration a filter aid such as diatomaceous earth is metered into the prefilt in line 16 via a line 19. As seen in the drawing filter system 18 comprises two filters 20A and 20B, which are operated serially so that one filter, e.g. filter 20A may be shut down for cleaning while permitting filtering through the remaining filter 20B. Providing two filters and operating the filters serially permits continuous filtering. Flow of prefilt into a selected filter 20A or 20B is controlled via a diverting valve 22. For example filters 20A and 20B may be shut down in sequence for cleaning every six to eight hours so that the total residence time of polyethylene particles in contact with the chloroform solvent is limited, for example, to less than about ten hours.

The filtrate withdrawn from the filter system 18 is then passed via a line 24 to a solvent/fat separation and recovery unit 26. It should be noted at this stage the filtrate is substantially free of dissolved polyethylene, and contains no polyethylene fines. The filtrate typically comprises from about 25 to 75 volume percent of tallow fats, with chloroform making up the remainder. Separation and recovery unit 26 preferably comprises a vacuum stripping column 28 in which the chloroform solvent is removed from the system as overhead, and substantially polyethylene-free tallow fat is recovered as bottoms. It is to be noted that stripping column 28 may comprise a relatively crude stripping column and include few plates since any carry-over of tallow fats in the column overhead will be recycled to the system and thus ultimately will be recovered. On the other hand, the bottoms from column 28 should be substantially solvent-free since any solvent carry-over in the bottoms would be lost in the subsequent soap making process. Generally stripping column 28 operates at a temperature of about 70° to 150° C. at relatively low pressure, e.g. 150 mm of mercury. The overhead from stripping column 28 is passed via a line 30 to a heat exchanger 32 wherein the chloroform vapors are condensed to liquid, and cooled to 50° C., and the condensed, cooled chloroform is then withdrawn from heat exchanger 32 and returned via a line 34 to column 12 for reuse. The bottoms from stripping column 28 are then passed via a line 36 as fat feedstock to a conventional soap making system indicated generally at 38. Soap making system 38 is of conventional construction and includes an hydrolysis column 40, fatty acid distillation column 42 and saponification column 44 the details of which have been omitted since they are believed not necessary for an understanding of the invention.

It is to be understood that the method shown in the description for contacting the solvent with the fat may also be achieved by a simple agitated tank and that the filters used may be continuous rotary driven or belt filters, continuous pressure leaf filters, inline polishing filters, or the like. Also a stripping medium such as inert gas, stripping steam or stripping gas may be employed to assist in the solvent removal, or a dry pre-flash step under vacuum or pressure followed by a vacuum stripping step which may or may not involve heat recovery from the pre-flash step may be employed.

EXAMPLES I–VI

The following examples, illustrative of the principals of the present invention, are based upon removal of polyethylene fines from feedstock samples comprising tallow and fine particles of polyethylene suspended in the tallow using as the selected organic solvent chloroform (Examples I, II and III) and butyl acetate (Examples IV, V and VI). The basic procedure was to cool the feedstock samples and the selected solvent to 40°–50° C., and the feedstock samples were then added to the solvent. Distomaceous earth (0.5 wt.% based on the weight of the feedstock sample) was added, and the admixture was then stirred for 5–10 minutes (Examples I, II, IV and V), or 10 hours (Examples III and VI). The resulting admixtures were then filtered through Fischer scientific grade fiberglass filter paper (available from Fischer Scientific Company) on a 9 cm. diameter Buchner funnel using vacuum (24–28" Hg.) across the filter. After filtering the solvent was driven off the filtrate by vacuum distillation, and liquid tallow material recovered which was then examined visually and the results recorded. Visually clear material was considered to be substantially polyethylene fines-free. The polyethylene fines content of the tallow material of Examples IV and V were determined by comparative spectrophotometry with samples containing known amounts of polyethylene fines. The Examples are summarized in Table I below:

| Example No. | I | II | III | IV | V | VI |
|---|---|---|---|---|---|---|
| Solvent | Chloroform | | | Butyl Acetate | | |
| Tallow feedstock-initial Polyethylene Content (ppm) | 1600 | 134 | 1600 | 1600 | 630 | 1600 |
| Solvent-to-feedstock ration (cc/gm) | 2/1 | 1/1 | 0.5/1 | 2/1 | 1/1 | 0.5/1 |
| Polyethylene content of Tallow after Filtration | C | C | Cl | <10 ppm | <10 ppm | Cl |

Note:
C represents clear solution. No determination of actual polyethylene content was made.
Cl represents cloudy solution. Cloudiness attributed to insufficient solvent dosage.

EXAMPLE VII

Following the general procedure of Examples I–VI, a continuous filtration run was made using 5500 grams of tallow feedstock and 5500 grams of butyl acetate as the solvent, in the presence of 27.5 grams of diatomaceous earth as a filter aid. The tallow feedstock contained 630 ppm polyethylene initially; following filtration and separation from the solvent the polyethylene content of the tallow as determined as being less than about 10 ppm. Total filtering time was about 10 hours.

One skilled in the art will recognize that the foregoing invention provides a number of technical advantages to the art. For one it provides a simple and relatively inexpensive system for removing polyethylene fines from tallow. Removing polyethylene fines in accordance with the present invention, i.e. following rendering of the raw animal fats offers economic advantages as compared to laborous removal of the polyethylene bags prior to rendering the raw fats. Moreover, the invention permits the advantageous processing of the more commonly available tallow, i.e. tallow containing 100–1000 or more parts of polyethylene per million parts of tallow. As mentioned above a normal tallow processing system includes a deaeration step to improve the color of the tallow. This deaeration step typically requires a temperature of about 120° C. and a pressure (absolute) of about 150 mm of Hg. This same deaeration step may be advantageously employed for stripping the solvent. Thus, it is possible to incorporate the equipment necessary for carrying out the process of the present invention into a rendering plant so that the tallow may be delivered to a soap manufacturer free of polyethylene fines, and thus demand a higher price. Moreover, the capital investment cost and the materials and operating costs of removing polyethylene fines from tallow in accordance with the present invention are more than offset by reduced clean-out costs and/or losses due to damage to soap making and glycerin handling equipment which would otherwise result from the presence of polyethylene fines in the tallow.

Various changes will be obvious to one skilled in the art in connection with the foregoing invention. For example, while chloroform is a preferred solvent due to energy and solvent capacity considerations, one skilled in the art will recognize that other organic solvents may be advantageously employed in the process of the present invention. Moreover, mixtures of organic solvents may be employed. The proportion of solvent-to-tallow employed will depend on the nature of the particular solvent used and the tallow being processed. Also, while the preferred operating range is 40°–50° C., it will be recognized by one skilled in the art that by limiting contact time and by an appropriate selection of solvents, it may be possible to operate column 12 at a temperature in excess of 50° C. The important requirement is that the contact time and contact temperature of the plastic polymer material in the solvent is limited so that little or no plastic polymer material will be dissolved in or softened by the solvent. Generally however the preferred solvents are organic materials which are liquid at 40°-50° C., and which have a boiling point below about 150° C. at 760 mm Hg pressure and thus permit the separation of the solvent without requiring a complex stripping system or substantial energy requirements. Also the solvent should be readily recoverable as a liquid using ambient cooling water in the heat exchanger.

It is to be appreciated that the invention is applicable to the treatment of tallow to remove polyethylene or other plastic polymers contained therein for use other than in soap making by continuous hydrolysis. For example, tallow treated in accordance with the present invention may be advantageously employed for making soap by the kettle process, or the tallow may be further processed for use in making cosmetics or other industrial products, e.g. candles or lubricants, or foods. Still other modifications will be obvious to one skilled in the art.

What is claimed is:

1. A method for separating plastic polymer impurities from a feedstock mixture comprising tallow and fine particles of said plastic polymer suspended in said tallow, said method comprising the steps in sequence of: contacting said feedstock with a selected organic solvent to form a solution comprising said solvent and dissolved tallow and containing undissolved fine particles of said plastic polymer; filtering said solution to remove said undissolved fine particles of plastic polymer; and recovering a filtrate which has a reduced plastic polymer impurities content.

2. A method according to claim 1, including the step of adjusting the temperature of said feedstock to just above its freezing point prior to contacting said feedstock with said solvent.

3. A method according to claim 2, including the step of treating said filtrate to separate said solvent and said dissolved tallow, and recycling said separated solvent to contact additional feedstock.

4. A method according to claim 3 wherein said solvent is separated from said filtrate by distilling off said solvent at reduced pressure.

5. A method according to claim 2 wherein said contacting is effected at a temperature in the range of from about 40° C. to 50° C.

6. A method according to claim 2, wherein said solvent has a boiling point below about 150° C. at 760 mm Hg.

7. A method according to claim 6 wherein said solvent is selected from the group consisting of halogenated hydrocarbons, esters, ketones, cyclic hydrocarbons, aliphatic hydrocarbons, and aromatic hydrocarbons.

8. A method according to claim 7 wherein said plastic polymer comprises fine particles of polyethylene.

9. A method according to claim 8, wherein said solvent comprises a halogenated aliphatic hydrocarbon.

10. A method according to claim 9 wherein said solvent is selected from the group consisting of 1,1,1 trichloroethane, trichloroethylene, methylene chloride, chloroform, carbon tetrachloride, ethyl chloride, dichloromethane, ethylene dichloride, dichlorodifluoromethane, methylene fluoride and ethyl fluoride.

11. A method according to claim 9 wherein said halogenated aliphatic hydrocarbon comprises a chloronated methane selected from the group consisting of chloroform, carbon tetrachloride and dichloromethane.

12. A method according to claim 8, wherein said solvent comprises an aromatic hydrocarbon.

13. A method according to claim 8 wherein said solvent comprises an ester selected from the group consisting of ethyl acetate, butyl acetate and amyl acetate.

14. In the rendering of raw animal fat to produce tallow, wherein a raw animal fat feedstock in plastic polymer containers is digested to produce a tallow product having fine particles of said plastic polymer suspended therein, the method of removing said fine particles of plastic polymer which comprises: adjusting said tallow product to just above its freezing point and contacting said tallow with a selected organic solvent to form a solution comprising said solvent and dissolved tallow and containing undissolved fine particles of plastic polymer; filtering said solution to remove said undissolved fine particles of plastic polymer and recover a filtrate which is substantially free of said plastic polymer; treating said filtrate to separate said solvent and dissolved tallow, and recycling said separated solvent for contacting additional tallow.

15. In a process for manufacturing soap by splitting a fat stock into fatty acids and glycerin, and then neutralizing said fatty acids with an alkali, wherein said fat stock comprises a tallow feedstock containing particles of finely divided plastic polymer material suspended therein, the improvement comprising the steps of: contacting said tallow feedstock with a liquid organic solvent to form a solution comprising said solvent and dissolved tallow and containing undissolved particles of said finely divided plastic polymer material; filtering said solution to remove said finely divided plastic polymer material and thereby provide a filtrate which is substantially free of said finely divided plastic polymer material; treating said filtrate to recover a fat stock which is substantially free of particles of finely divided plastic polymer material; and, using said recovered fat stock as feed for said splitting.

16. In a process according to claim 15, including the step of adjusting the temperature of said tallow feedstock to just above its freezing point prior to contacting said feedstock with said solvent.

* * * * *